US012699708B2

(12) United States Patent
Kati et al.

(10) Patent No.: US 12,699,708 B2
(45) Date of Patent: Aug. 4, 2026

(54) METHOD, SYSTEM, AND COMPUTER PROGRAM PRODUCT FOR IMPLEMENTING A STANDBY DATABASE WITH REAL-TIME SECURE SUBSETTING

(71) Applicant: Oracle International Corporation, Redwood Shores, CA (US)

(72) Inventors: John Kati, Foster City, CA (US); Sachin Vijaykumar Sonawane, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 673 days.

(21) Appl. No.: 17/444,047

(22) Filed: Jul. 29, 2021

(65) Prior Publication Data

US 2023/0034426 A1     Feb. 2, 2023

(51) Int. Cl.
    *G06F 16/27*       (2019.01)
    *G06F 16/23*       (2019.01)
    *G06F 16/2457*     (2019.01)

(52) U.S. Cl.
    CPC .......... *G06F 16/27* (2019.01); *G06F 16/2358* (2019.01); *G06F 16/24573* (2019.01)

(58) Field of Classification Search
    None
    See application file for complete search history.

(56) References Cited

U.S. PATENT DOCUMENTS 6,980,988 B1 * 12/2005 Demers ............... G06F 11/2082
8,725,693 B2 *  5/2014 Lee .................... G06F 11/2028
                                                          707/640

8,930,381 B2    1/2015  Raghunathan et al.
2009/0100527 A1 4/2009  Booth et al.
2010/0030795 A1 2/2010  Pattabhi et al.
2011/0113050 A1 5/2011  Youn et al.
2012/0259877 A1 10/2012 Raghunathan et al.
2013/0144901 A1 6/2013  Ho et al.
2013/0282697 A1 10/2013 Barbas et al.
2014/0019467 A1 1/2014  Itoh et al.
2014/0164405 A1 6/2014  Tsai et al.
2016/0092535 A1 3/2016  Kuchibhotla et al.
2016/0224797 A1 8/2016  Schrock et al.
2017/0116321 A1* 4/2017 Jain ......................... G06F 16/27
2017/0221154 A1 8/2017  Eftekhari et al.
2017/0323119 A1 11/2017 Harp et al.

(Continued)

OTHER PUBLICATIONS

Final Office Action for U.S. Appl. No. 16/163,171 dated Jan. 10, 2022.

(Continued)

*Primary Examiner* — Amresh Singh

(74) *Attorney, Agent, or Firm* — Vista IP Law Group, LLP

(57)                ABSTRACT

Disclosed are methods, systems, and articles of manufacture for implementing a standby database with a secure subsetting technique. One or more sensitivity criteria for a change may be determined in a primary database. A tagged redo record may be determined for the change, wherein the tagged redo record pertains to sensitive information in the change and the one or more sensitivity criteria. The change may be constructed on a standby database with data subsetting based at least in part upon the tagged redo record and a replication mode of the standby database.

18 Claims, 18 Drawing Sheets

(56) References Cited

U.S. PATENT DOCUMENTS

2017/0351716 A1    12/2017  Higginson et al.
2020/0125667 A1 *   4/2020  Sonawane ............. G06F 16/252

OTHER PUBLICATIONS

Final Office Action for U.S. Appl. No. 16/163,171 dated Dec. 18, 2020.
Non-Final Office Action for U.S. Appl. No. 16/163,171 dated Jun. 24, 2021.
Non-Final Office Action for U.S. Appl. No. 16/163,171 dated Jun. 11, 2020.
IBM Spectrum Copy Data Management™ 2.2.7.0, User's Guide, IBM, (Jul. 27, 2017), date retrieved from google.
Pepper, C. et al., "Understanding and Selecting Data Masking Solutions: Creating Secure and Useful Data", Version 1.0, Securosis, (Aug. 10, 2012).
NET 2000, "Data Masking: What You Need to Know What You Really Need To Know Before You Begin", A Net 2000 Ltd. White Paper, (Dec. 12, 2010), date retrieved from google.
Informatica, "Best Practices for Dynamic Data Masking: Securing Production Applications and Databases in Real-Time", White Paper, Informatica, (Oct. 2011).
Oracle, "Oracle Data Masking and Subsetting: Frequently Asked Questions (FAQ)", Oracle, Sep. 2016.
Preethy P G et al., "Data Masking and Subsetting Guide Enterprise Manager 13c", Oracle, (Dec. 2015).
Notice of Allowance for U.S. Appl. No. 16/163,171 dated Feb. 27, 2024.
Notice of Allowance for U.S. Appl. No. 16/163,171 dated Jun. 24, 2024.

\* cited by examiner

Table 1

| Column Name Pattern | Column Data Pattern | Sensitivity Level |
|---|---|---|
| CREDIT_CARD.*;CARD_NUMBER.*;CCN.*;CREDIT CARD.* | ^((4[0-9]{3})\|(5[1-5][0-9]{2})\|(6011))[-. _]?[0-9]{4}[-. _]?[0-9]{4}[-. _]?[0-9]{4}\| 3{47}([-. _]?[0-9]){13}$ | Highly Confidential |
| EMAIL.*;MAIL.* | ^[a-zA-Z0-9._%+-]+@[a-zA-Z0-9.-]+\.[a-zA-Z]{2,4}$ | Confidential |
| SOCIAL.*;SSN.*;SOCIAL_SEC.* | ^[0-9]{3}[- ]?[0-9]{2}[- ]?[0-9]{4}$ | Highly Confidential |

FIG. 21

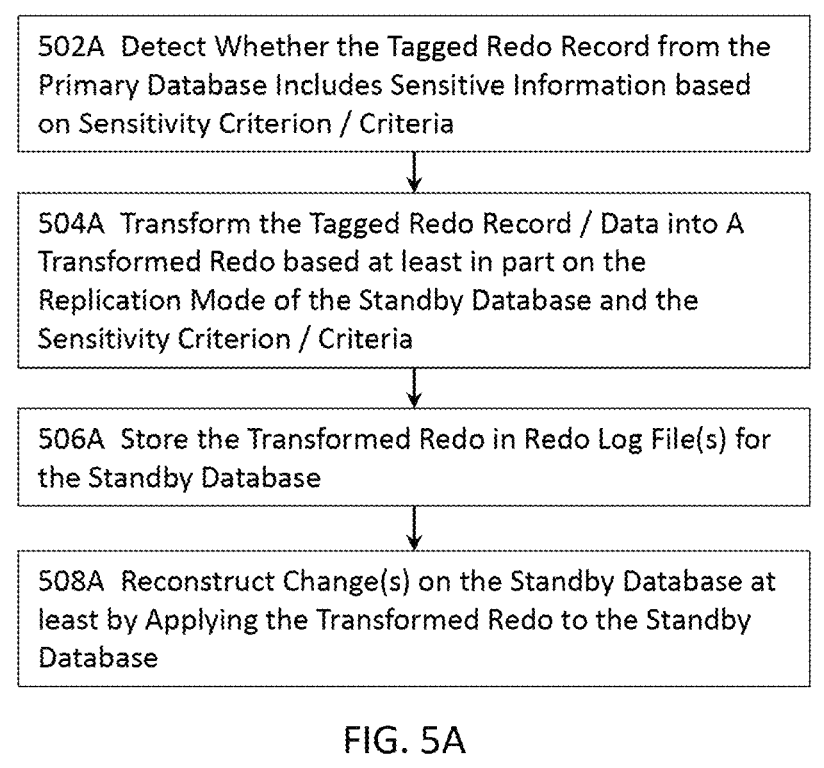

502A  Detect Whether the Tagged Redo Record from the Primary Database Includes Sensitive Information based on Sensitivity Criterion / Criteria 504A  Transform the Tagged Redo Record / Data into A Transformed Redo based at least in part on the Replication Mode of the Standby Database and the Sensitivity Criterion / Criteria 506A  Store the Transformed Redo in Redo Log File(s) for the Standby Database 508A  Reconstruct Change(s) on the Standby Database at least by Applying the Transformed Redo to the Standby Database

FIG. 5A

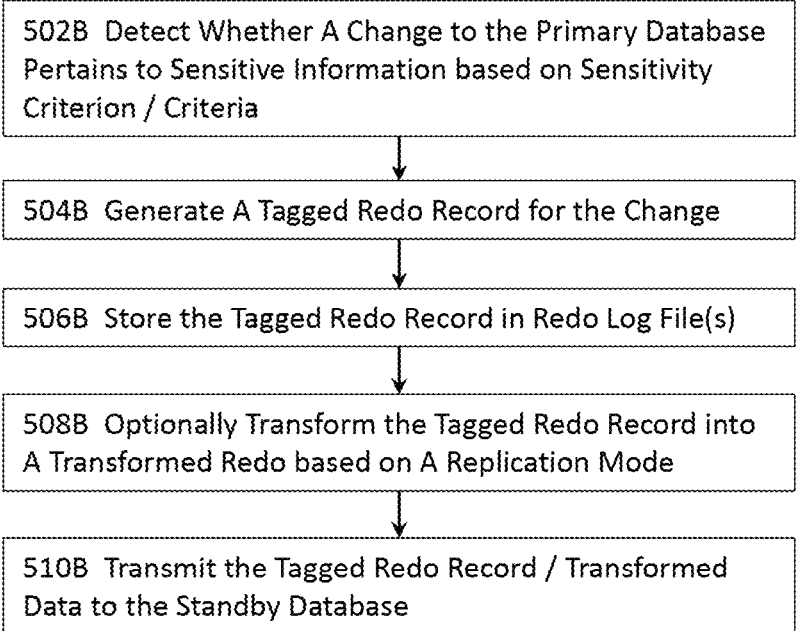

502B　Detect Whether A Change to the Primary Database Pertains to Sensitive Information based on Sensitivity Criterion / Criteria 504B　Generate A Tagged Redo Record for the Change 506B　Store the Tagged Redo Record in Redo Log File(s)

508B　Optionally Transform the Tagged Redo Record into A Transformed Redo based on A Replication Mode 510B　Transmit the Tagged Redo Record / Transformed Data to the Standby Database

METHOD, SYSTEM, AND COMPUTER PROGRAM PRODUCT FOR IMPLEMENTING A STANDBY DATABASE WITH REAL-TIME SECURE SUBSETTING

BACKGROUND

Sensitive data within a production database may be generally proliferated within an organization or even outside an organization. For example, a mobile manufacturing company located in an European Union (EU) country may store and process personal sensitive information of its customers placing requests using their online web-portal in their production database. The development, testing, customer care, and billing efforts, etc. may be outsourced to external subcontractors in, for example, Asia or North America where the employees often copy the customer's data to their local systems for development, testing and processing respectively.

A company may also partner with payment and delivery companies of different countries and provide them with individual's data for the processing of an order. As sensitive data becomes more and more proliferated, the likelihood of data breaches increases. The growing security threats have increased the need to limit exposure of sensitive information. Many regulations have already come up in many nations like General Data Protection Regulation (GDPR), California Consumer Privacy Act (CCPA), etc., which mandate sensitive data minimization. For example, Article 5 of the GDPR mandates data minimization to reduce the amount of personal data collected, processed, shared and retained. Article 17 of GDPR mandates the right to be forgotten which allows individuals or organizations the right for erasure of personal data without undue delay.

To comply with the regulations such as GDPR, CCPA, etc., before any data is shared, it might be best to identify and remove sensitive data from the database while keeping the rest for specific business purposes.

Techniques such as sensitive data discovery combined with data subsetting techniques, etc. reduce security risks by detecting sensitive data and deleting rows comprising sensitive data from a database while also helping with minimizing storage costs in non-production environments.

Conventionally, sensitive data discovery and data subsetting are performed outside the production database using external tools to create a new database with sensitive data deleted. For example, some legacy approaches create a standby copy of the production database, identify the sensitive data to be deleted, apply the subsetting rules to delete the rows in-place while retaining the remaining rows to finally create a subsetted database with sensitive data removed. These approaches suffer, however, from several drawbacks.

One significant issue is that as data continues to be inserted in a production database, detecting sensitive data may not guarantee one-hundred percent detection of the sensitive data in real time. This is because an external tool that works upon a standby copy of the database is likely to be working upon a version of the production database that is probably at least somewhat out-of-date, and hence will not be able to perform real-time detection of the sensitive data in the production database. As such, subsetted data on a standby database may easily become out of sync. In addition, copies of the production database may be made periodically or frequently so that detecting new sensitive data, applying subsetting rules, and creating a subset database that may be safely shared may also be required to be periodically or frequently performed. While the operation costs of generating a copy of production database is already significant, the challenge to keep the subsetted data to be in sync in real-time or nearly real-time with the corresponding production data is nevertheless extremely challenging.

What is needed is a system/method that would overcome these issues to create a subset database that is in real-time sync with production database while also removing the sensitive data so that organizations can comply with various regulations and avoid huge fines.

Therefore, there is a need for methods, systems, and computer program products for create a standby database that is in sync with the corresponding production database in real-time or nearly real-time while complying with various regulations in a more accurate, efficient, and/or effective manner as well as to address at least the aforementioned issues, shortcomings, and shortcomings.

SUMMARY

Disclosed are method(s), system(s), and article(s) of manufacture for implementing a standby database with a secure subsetting technique in one or more embodiments. Some embodiments are directed at a method for implementing a standby database with real-time secure subsetting techniques. In these embodiments, one or more sensitivity criteria for a change may be determined in a primary database. A tagged redo record may be determined for the change, wherein the tagged redo record pertains to sensitive information in the change and the one or more sensitivity criteria. The change may be constructed on a standby database with data subsetting based at least in part upon the tagged redo record and a replication mode of the standby database.

Some of these embodiments detect whether the tagged redo record includes sensitive information based at least in part upon the one or more sensitivity criteria and transform the tagged redo record or data pertaining to the one or more sensitivity criteria in the tagged redo record into a transformed redo based at least in part upon a replication mode of the standby database and the one or more sensitivity criteria.

In some of the immediately preceding embodiments, the transformed redo may be stored in a set of one or more standby redo log files for the standby database. The data subsetting for reconstructing the change on the standby database may be performed at least by applying the transformed redo to the standby database, wherein the sensitive information is discarded, nullified, redacted, or replaced in the transformed redo.

In addition or in the alternative, instead of operating with a "physical" standby, the standby database in an alternative embodiment comprises a "logical" standby database, where one or more structured query language (SQL) statements are generated using the tagged redo record, and the sensitive information is discarded, nullified, redacted, or replaced based upon the SQL generated from the tagged redo. In some of the immediately preceding embodiments, the data subsetting for reconstructing the change on the standby database may be performed at least by executing the one or more SQL statements on the standby database.

In some embodiments, the data subsetting for reconstructing the change on the standby database may be performed at least by updating one or more standby data blocks for the standby database with a copy of one or more primary data blocks for the primary database based at least in part upon the transformed redo, wherein the sensitive information is discarded, nullified, redacted, or replaced in the copy of the one or more data blocks on the primary database.

In addition or in the alternative, the tagged redo record for the change comprises a metadata portion and a redo portion, the metadata portion includes first information pertaining to the one or more sensitivity criteria, and the redo portion comprises change data pertaining to the change.

Some embodiments determine whether the replication mode is a secure replication mode or a normal replication mode for the standby database and whether the standby database is a physical standby database or a logical standby database.

In some of these embodiments, the data subsetting may be configured based at least in part upon whether the replication mode is the secure or the normal replication mode and whether the standby database is the physical standby database or the logical standby database. The change may be reconstructed on the standby database using the data subsetting that has been configured.

In some embodiments where the standby database is a physical standby database in the normal replication mode, the change on the primary database is reconstructed on the standby database by overriding the one or more sensitive criteria for the change and applying, to the standby database, a copy of one or more primary data blocks.

In some embodiments where the standby database is the physical standby database in the secure replication mode, the change on the primary database is reconstructed on the standby database by modifying the sensitive information in a copy of one or more primary data blocks into one or more modified data blocks and by applying the one or more modified data blocks to the standby database.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

Additional and other objects, features, and advantages of the disclosure are described in the Detail Description, figures, and claims.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and

Figure 1:
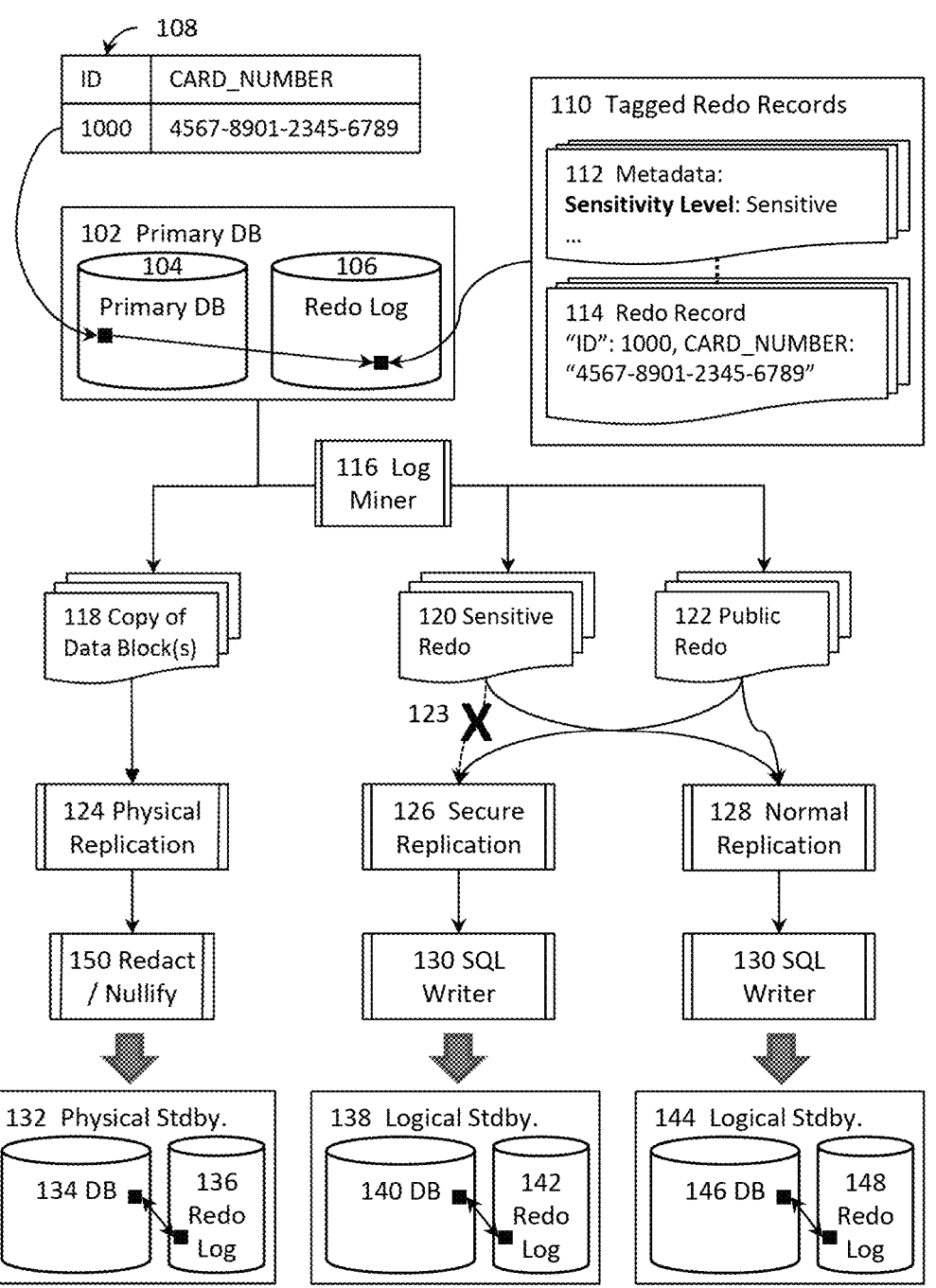

4 objects of various embodiments of the invention, a more detailed description of the present disclosures briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1 illustrates a high-level schematic block diagram of a simplified system for implementing a standby database with real-time secure subsetting techniques in one or more embodiments.

Figure 2A:
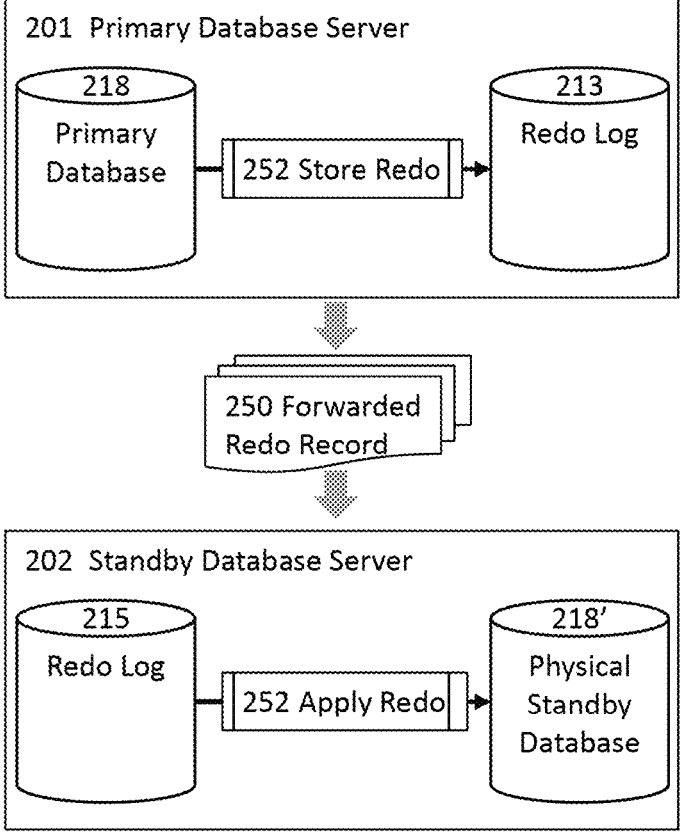
Figure 2B:
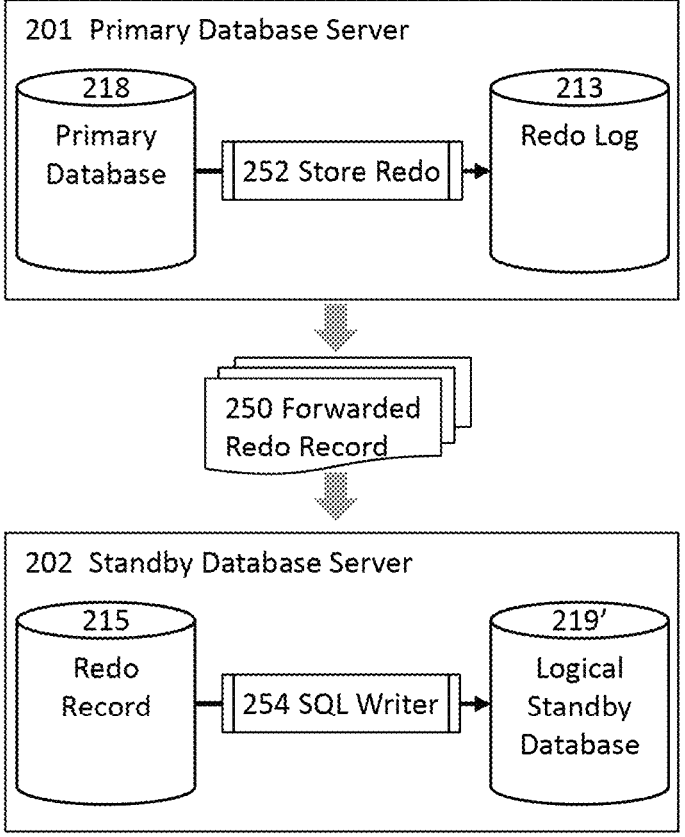

FIGS. 2A-2B illustrate an example database system including a primary database server and a standby database in one or more embodiments.

FIGS. 2C-2H illustrate some examples of implementing a standby database with real-time secure subsetting techniques in one or more embodiments.

FIG. 2I illustrates an example approach to configure sensitivity criterion/criteria to identify sensitive data.

Figure 3A:
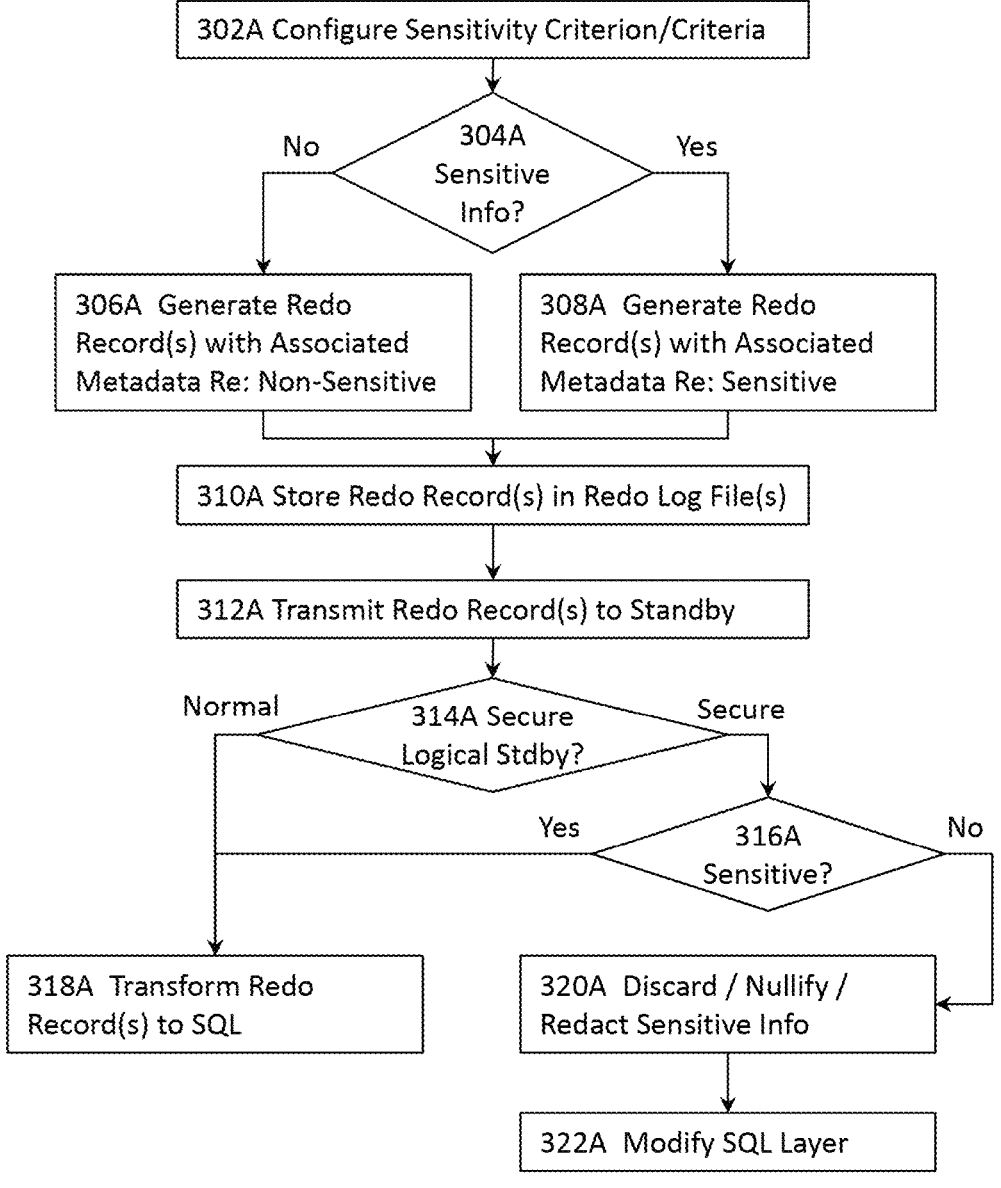

FIG. 3A illustrates a more detailed block diagram for implementing a logical standby database with real-time secure subsetting techniques in one or more embodiments.

Figure 3B:
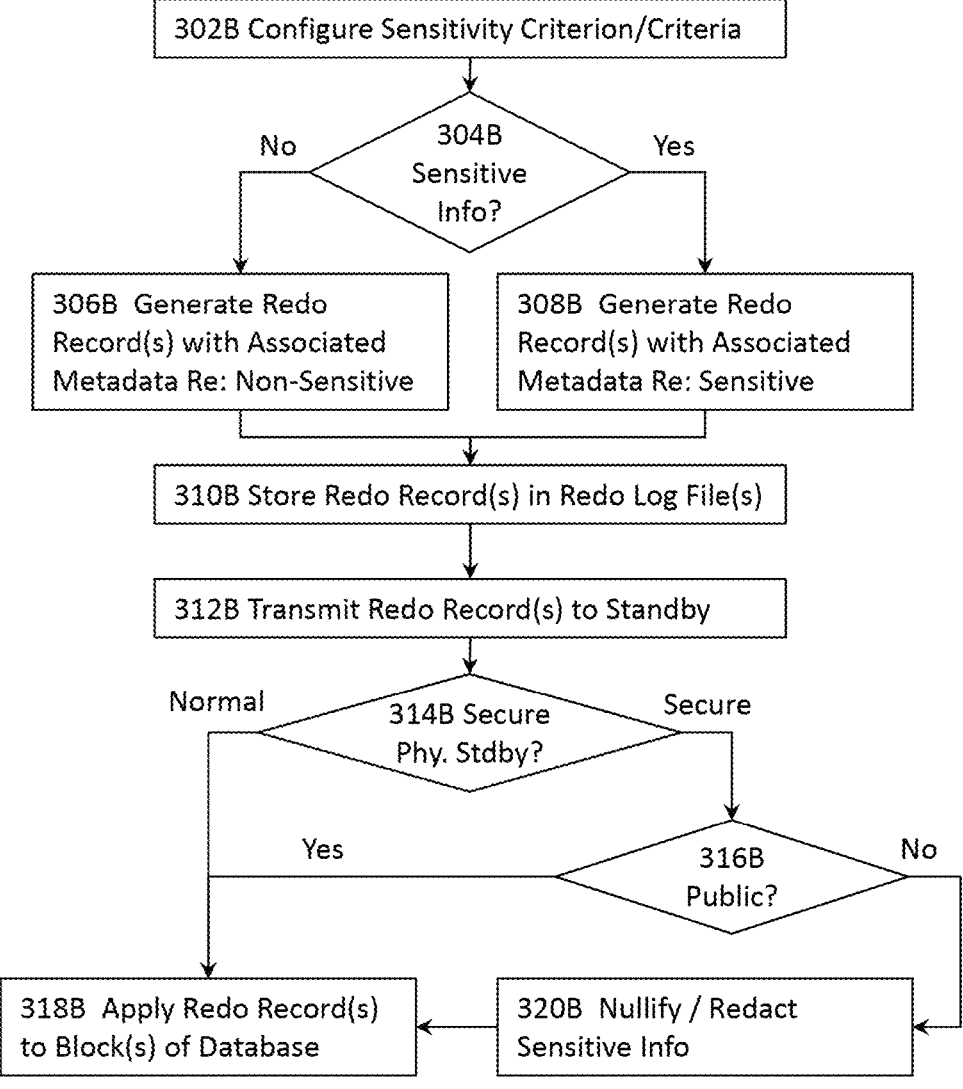

FIG. 3B illustrates a more detailed block diagram for implementing a physical standby database with real-time secure subsetting techniques in one or more embodiments.

Figure 4:
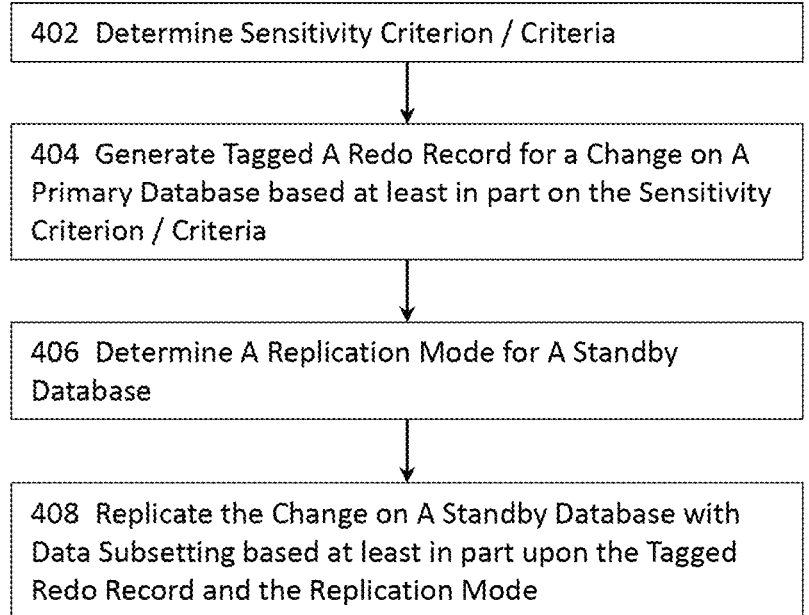

FIG. 4 illustrates a high-level block diagram for implementing a physical standby database with real-time secure subsetting techniques in one or more embodiments.

FIG. 5A illustrates a high-level block diagram for implementing a standby database with real-time secure subsetting techniques on a primary database in one or more embodiments.

FIG. 5B illustrates another high-level block diagram for implementing a standby database with real-time secure subsetting techniques on the standby database in one or more embodiments.

Figure 6:
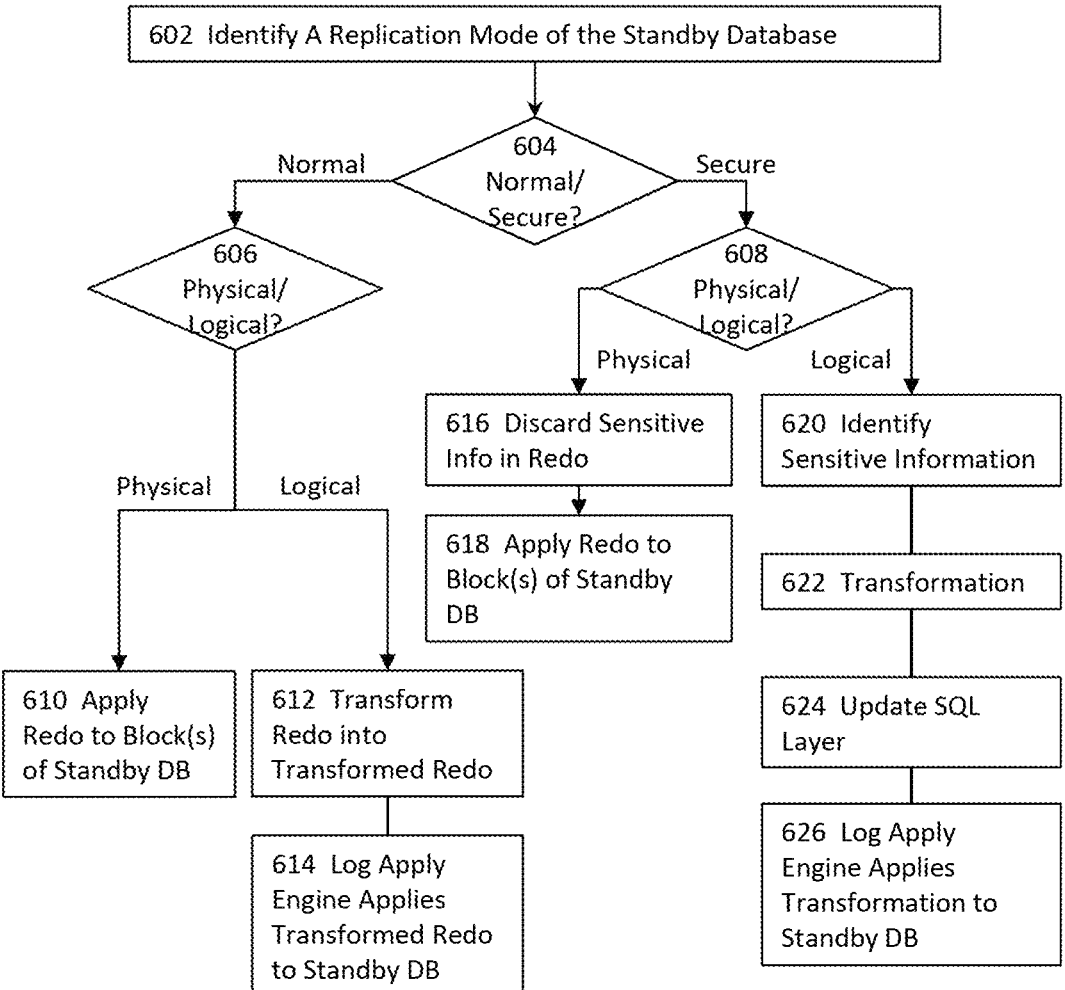

FIG. 6 illustrates more details about a portion of FIG. 4 for implementing a standby database with real-time secure subsetting techniques in one or more embodiments.

Figure 7:
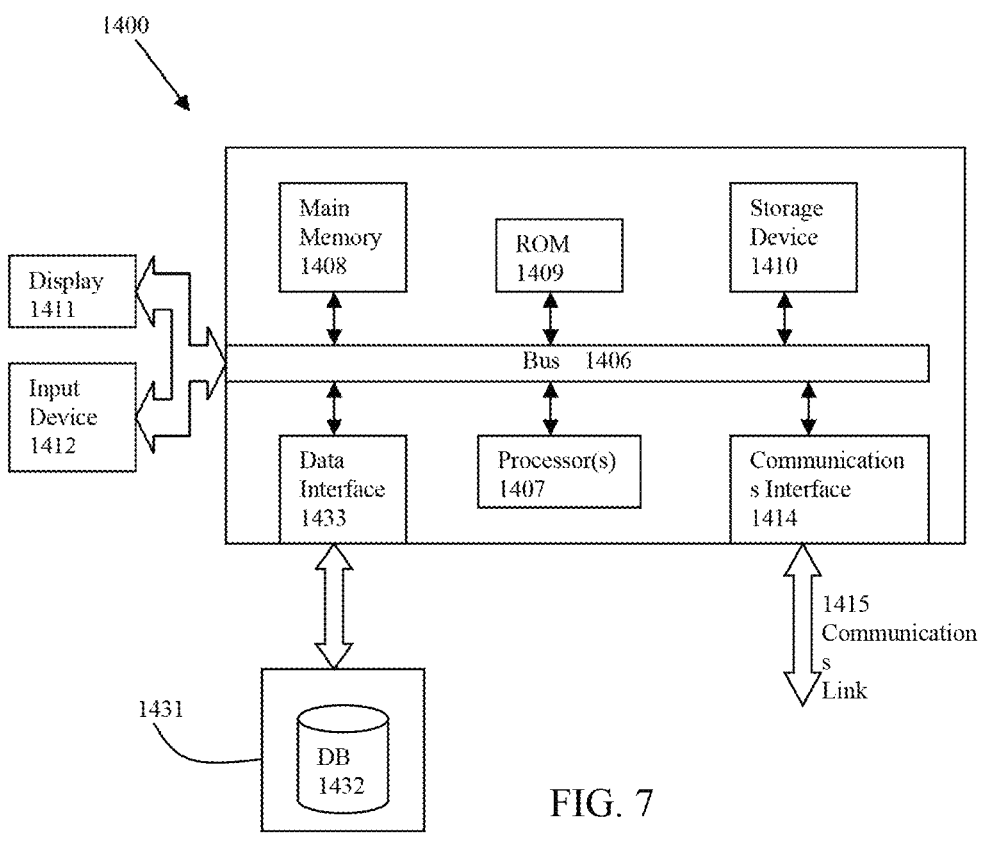

FIG. 7 illustrates a computerized system on which a process for implementing a standby database with real-time secure subsetting techniques may be implemented.

Figure 8:
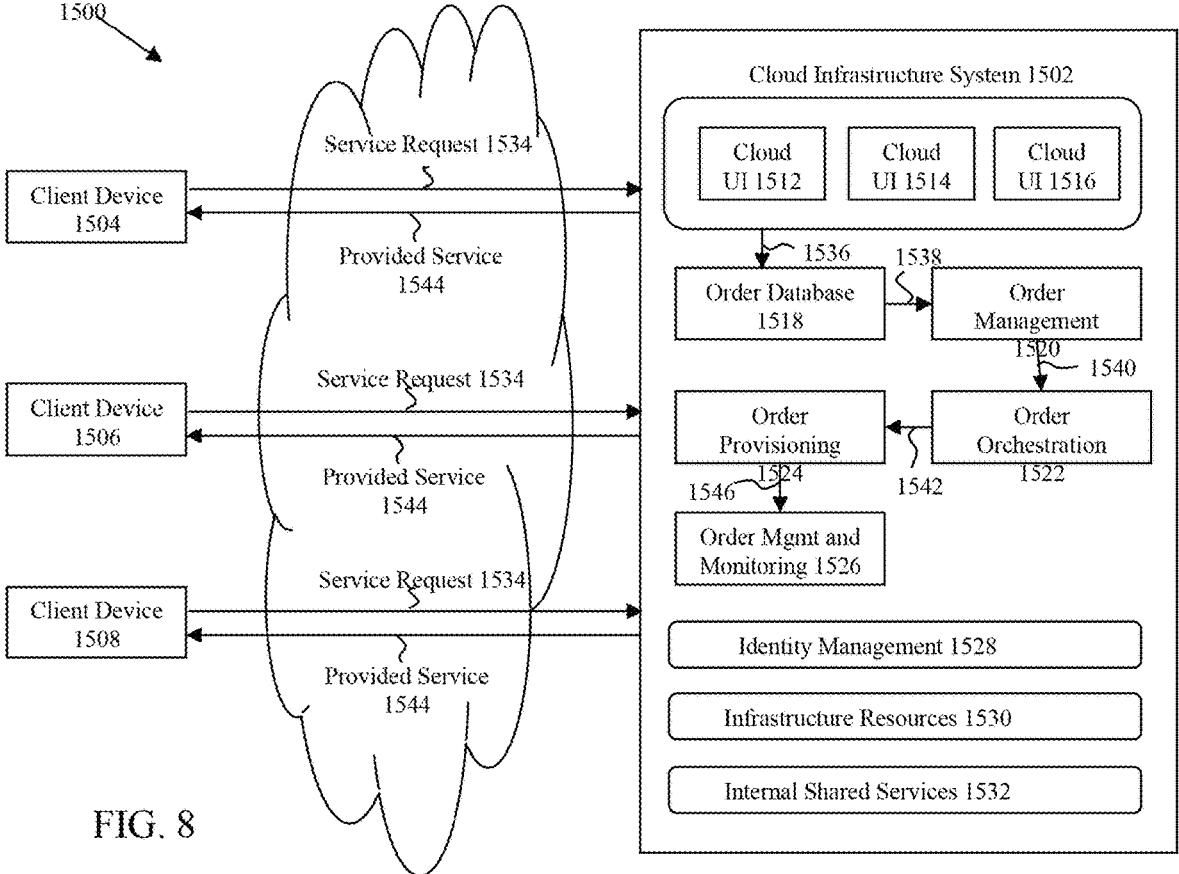

FIG. 8 is a block diagram of one or more components of a system environment in which services may be offered as cloud services, in accordance with an embodiment of the present invention.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the invention.

Further, various embodiments encompass present and future known equivalents to the components referred to herein by way of illustration.

Further, various embodiments encompass present and future known equivalents to the components referred to herein by way of illustration. It shall be noted that various features and techniques are described hereinafter in terms of embodiments and/or examples. Unless otherwise explicitly described as mutually exclusive, any embodiment, example, feature, and/or characteristic described herein may be readily combined in any suitable manner with any other embodiment, example, feature, and/or characteristic, without departing from the scope or spirit of the present disclosures. All such modifications are intended to be within the scope of claims associated with this disclosure.

In the following description, certain specific details are set forth in order to provide a thorough understanding of various disclosed embodiments. However, one skilled in the relevant art will recognize that embodiments may be practiced without one or more of these specific details, or with other methods, components, etc. In other instances, well-known structures associated with computing systems have not been shown or described in detail to avoid unnecessarily obscuring descriptions of the embodiments.

In addition, unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It shall be noted that although some examples or embodiments are described herein with reference to connect module, the same techniques may also be provided to other types of objects in an electronic design. Thus, the reference to connect module or connect modules is merely described herein as non-limiting examples.

FIG. 1 illustrates a high-level schematic block diagram of a simplified system for implementing a standby database with real-time secure subsetting techniques in one or more embodiments. In these one or more embodiments, a primary database server 102 may include a primary database 104 and a set of one or more redo log files 106. A change involving adding or updating an identifier and a credit card number 108 in the primary database. A redo record 110 may be created in the set of one or more redo log files 106. The redo record 110 may be tagged or associated with the sensitive level pertaining to the change and may thus be referred to as a tagged or enhanced redo record 110. In some embodiments, a tagged or enhanced redo record 110 may include a metadata portion 112 that further includes the sensitivity level pertaining to the change or information (e.g., an alpha-numeric character) pertaining to the sensitivity level of the change. In these embodiments, a tagged or enhanced redo record 110 may further include a redo record portion 114 that includes, for example, the actual data or a delta to be reconstructed when the redo record is applied.

The primary database server 102 may comprise or may otherwise be operatively coupled to a log miner 116 (e.g., a log miner for the primary database or for the standby database) that performs various analysis on, for example, a redo record, a redo log file, or even a set of one or more redo log files. For example, a log miner 116 may analyze the content of a redo record to determine whether the redo record comprises sensitive or confidential information whose storage in a standby database may cause a violation of one or more privacy regulations. The log miner 116 may further function in conjunction with the primary database server 102 to identify one or more data blocks pertaining to the change 108.

A data block may be the smallest unit of storage that the primary database may use or allocate and thus constitutes the finest level of granularity in the storage unit hierarchy. A data block corresponds to a specific number of bytes of physical database space on disk. The primary database 102 may thus request data in multiples of such data blocks. In terms of the storage unit hierarchy, a database may include a plurality of segments where a segment may include one or more extents of the same size or different sizes. A segment thus includes a set of extents that have been allocated for a specific type of data structure that are in a tablespace. An extent comprises a specific number of contiguous data blocks that are allocated for storing a specific type of information.

In some embodiments where a redo record comprises sensitive or confidential data, the log miner 116 determines one or more data blocks 118, sensitive or confidential redo data 120 (if any), and non-sensitive or public redo record 122 (if any). For physical replication 124, a copy of the one or more data blocks 118 may be created for the standby database. In some embodiments, a log miner may further determine whether sensitive information or data in a redo record is to be discarded, nullified, replaced, or redacted (150) based at least in part upon a replication mode of a standby database in order to comply with pertinent regulations. For example, in a database 134 on the physical standby 132 in a secure replication mode, the copy of the one or more blocks may first be transformed (e.g., discarded, nullified, replaced, or redacted) into a transformed copy, and the transformed copy of a redo may then be stored in a redo log 136 and applied to the database 134 in the physical, secure standby 132.

In some embodiments, a log miner 116 (e.g., a log miner for the standby database or for the standby database) may analyze the contents of a redo record (or a redo log file) to determine whether the redo record comprises sensitive data or information and, if so, separately process the sensitive data or information 126 and public, non-sensitive data or information 128 based at least in part upon, for example, the sensitivity levels of data in the redo record.

For a logical standby database (e.g., a logical, secure standby 138 or a logical, normal standby 144), a redo record may be transformed via a SQL (structured query language) writer 130 into a SQL statement to be applied to effect the redo record at the standby. For example, an SQL writer 130 may generate one or more SQL statements by using at least the redo record portion 114 of a tagged redo record 110. The SQl statement may then be applied (e.g., by a log apply engine for the standby database) to reconstruct or replicate the change 108 on the standby database.

For example, for a logical standby database 140 in a secure replication mode 126 on a logical standby 138, only the public, non-sensitive redo data 122 will be effected as actual visible changes by one or more SQL statements by the SQL writer 130 from the redo in the redo log 142; and the one or more SQL statements may then be applied to the database 140 in the logical, secure standby 138. In this example, the sensitive redo data 120 may be discarded, replaced, redacted, or nullified and will not be reconstructed at the logical, secure standby 138.

As another example, for a logical standby database 146 in a normal replication mode 128 on a logical standby database 144, both the sensitive redo data 120 and the public, non-sensitive redo data 122 may be addressed by the same SQL writer instance 130 or a different SQL writer instance 130 by one or more SQL statements, and redo for both data 120 and 122 may be stored in the redo log 148 for the logical standby database 146. In this latter example, the sensitivity levels in the redo record portion 114 may be ignored or overridden. The one or more SQL statements may then be applied to the logical, normal standby database 146.

It is noted that some embodiments will transform the redo records to discard, replace, redact, or nullify sensitive data before transmission of the redo records from the primary to the standby. With this embodiment, the sensitive content will thus be altered or removed so that it will not exist (in part or whole) on the standby. In an alternative embodiment, the original redos may be transmitted from the primary to the standby (e.g., to be stored in a redo log on the standby), but with sensitive content discarded, replaced, redacted, or nullified prior to being applied to the database on the standby. In this embodiment, some or all of the sensitive data may exist on the standby (e.g., in a redo log), but would still not be easily accessible to users since the sensitive data is not in the database on the standby and therefore not reachable by querying the database (e.g., using a SQL statement).

FIGS. 2A-2B illustrate an example database system including a primary database server and a standby database in one or more embodiments. For illustrative purposes FIG. 2A shows a database system that includes a primary database server 201 on which a primary database 218 resides. A redo record may be generated for a change made to the primary database 218 and may be stored (252) in a redo log 213. The system also includes a mechanism to generate a standby database 218' on a standby database server 202.

A standby database is a replica of a primary database, where the standby database may be created to protect against disasters or data corruption that occur to the primary database, and/or to allow for supplemental reporting that occur at the standby. For example, if a primary database is destroyed or if data stored in the primary database is corrupted, a failover may be performed such that a standby database becomes the new primary database. As another example, many reporting applications execute on standby databases to offload computer processing from the primary because the data between the standby and the primary are generally synchronized. Some of these reporting applications require the data on the standby to be as close to or as near identical to the primary as possible.

Different types of transaction log records may be maintained in a database system. A common transaction logging strategy is to maintain redo records that log all changes made to a database. With "write ahead logging", each change to data is first recorded in the redo log, and only afterwards is that change actually made to the database block corresponding to the changed data. This "write ahead logging" protects against the situation when a system failure occurs and the version of the database data that is immediately restored from disk does not accurately reflect the most recent state of the database. This may occur because of changes to the data that has only occurred in cache, and have not been recorded to disk before the failure.

If redo log has been properly maintained for these cache-only changes, then recovery may be performed by applying the redo records to roll the database forward until it is consistent with the state that existed just before the system failure. In a disaster recovery system, the redo records may also be used to synchronize a standby database with a primary database. Redo records may be used to allow any changes that occur at a primary database to be replicated to a standby database. For example, the redo record representing a change made to the primary database 218 may be forwarded (250) to the redo log 216 for standby database 218'; and the redo record may be applied (252) to the physical standby database 218' to reconstruct the change on the physical standby database 218'.

In some embodiments (e.g., for "physical replication"), the redo records correspond to changes made to the contents of a database on a block-by-block basis, and thus, application of the redo records at the standby database creates physical copies of data blocks from the primary database. This means that when redo records are generated in response to logged changes made to the contents of a primary database, these records are sent to a standby database where the same changes are made to ensure that the contents of the standby database remain identical to those of the primary database. In this way, if a disaster occurs at the primary, then a "failover" operation can be implemented to allow the system to continue handling work from the standby system. As illustrated in FIG. 2A, the primary database may generate redo records that are stored in a redo log at the primary database server. For disaster recovery purposes, at the standby server, the received copies of the redo records are placed into a redo log. The redo records are used to reconstruct changes made to the contents of the primary database which are applied to the standby database to maintain the standby in synchronization with the primary.

In some embodiments (e.g., for "logical replication"), log miner or log mining technology may be used to transform the redo logs on the standby into SQL statements and a logical apply engine is used to apply these SQL statements on the standby database. Since the standby database is updated using SQL statements, it must remain open during the execution of the SQL statements. This setup is illustrated in FIG. 2B.

In some embodiments of the invention, the approach of applying redo records from a primary database 218 to create a standby database 218' may be used to generate a subset database with sensitive data removed. The generated redo records may be tagged with additional metadata about the sensitivity of the data within the record which may be used to subset data on the standby.

For logical standby replication, the sensitivity of data present as part of the redo record may be used to determine whether the redo record needs to be applied or not on the standby database. In the case of physical standby replication, because the physical structure of the standby database 218' should remain identical to that of primary database 218, the rows that need to be subsetted would be nullified, discarded, replaced, randomized, or redacted, and an SQL layer may be enhanced to ignore these data for any subsequent queries on the same. In case of a logical standby database 219', a redo record or a tagged redo record may be first transformed by a SQL writer 254 into one or more SQL statements which may then be executed on the logical standby database 219' to reconstruct the change on the logical standby database 219'.

Figure 2C:
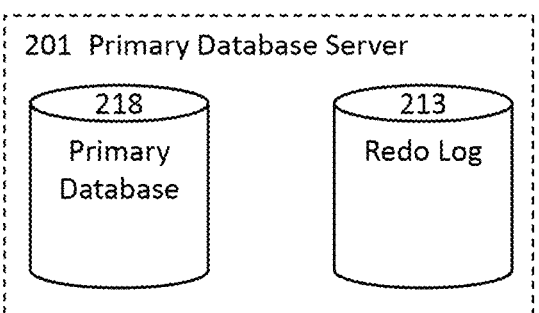

FIGS. 2C-2H illustrate some examples of implementing a standby database with real-time secure subsetting techniques in one or more embodiments. More specifically, FIGS. 2C-2H provide an illustration of an approach to create a subset logical standby database with sensitive data removed according to some embodiments. FIG. 2C shows a primary database server 201 having a primary database 218 and one or more redo log files 213. The primary database 218 may include one or more relational database tables. When changes are made to any of the tables within the primary database 218, corresponding change records (e.g., redo records) may be recorded for those changes, and these change records may be stored in one or more redo log files 213.

Figure 2D:
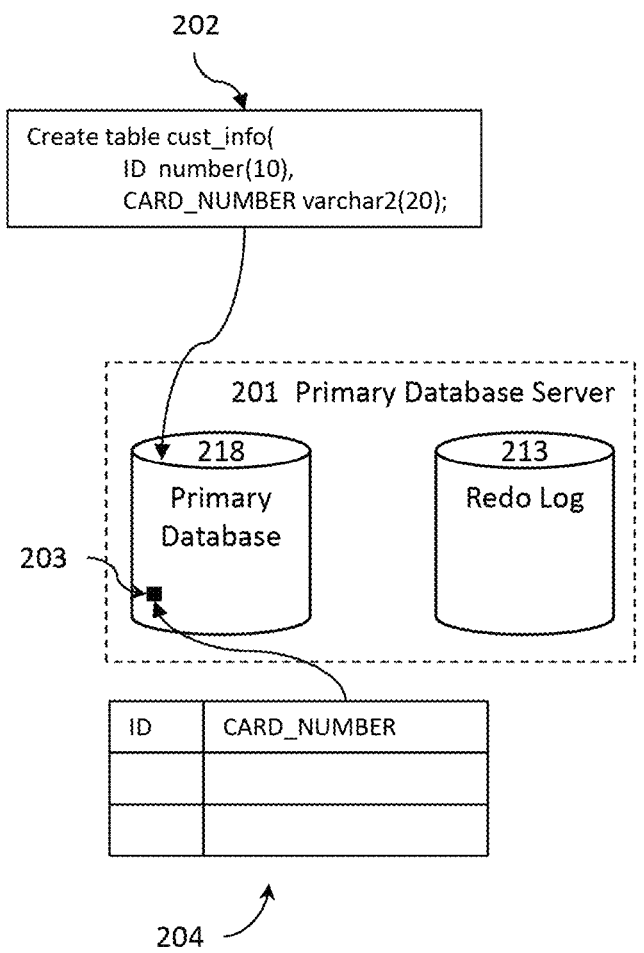
Figure 2E:
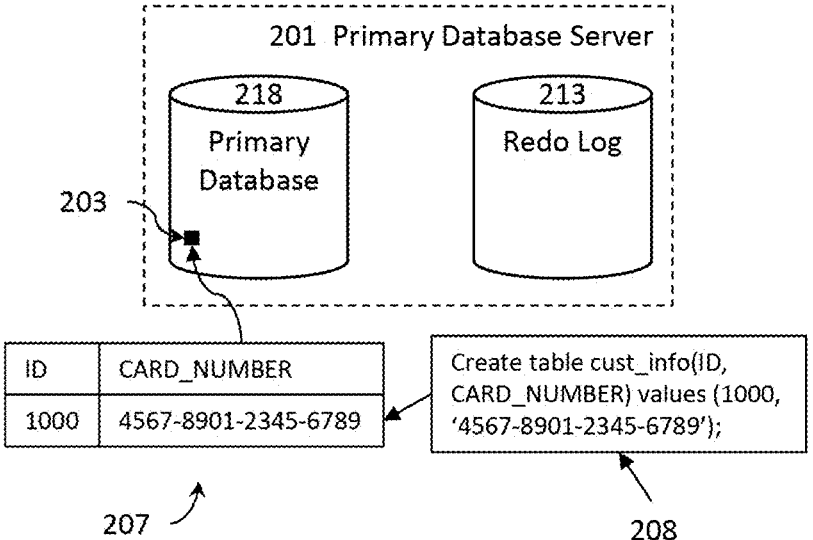

FIG. 2D illustrates an example for creating example table in the primary database 218. In particular, the example SQL statement creates a table 203 (e.g., a "Cust_Info" table) that includes two columns respectively indicating name patterns and data patterns, where a first column ("ID") may hold, for example, the number data type and a second column ("CARD_NUMBER") holds the varchar2 (or varchar(2)) data type. In some embodiments, a database table may be created with an additional column indicative of the sensitivity level of the corresponding data in the respective rows. FIG. 2E further illustrates an example where a redo record is created for the inserted data 207 (e.g., the inserted data having the value "1000" into the "ID" column and inserts the characters "4685-1458-3658-9848" into the "CARD_NUM-BER" column), and the redo record is further transformed into a structured query language (SQL) statement (e.g., Create table cust_info(ID, CARD_NUMBER) values (1000, '4567-8901-2345-6789');) that may be reapplied to reconstruct the change (e.g., the inserted data 207) in a logical standby database under a normal replication mode.

It should be noted that although these embodiments and examples described herein refer to two data types, other data types such as any combinations of string data types (e.g., CHAR( ), BINARY( ), VARBINARY( ), ENUM( ), SET( ), etc.), numeric data types (e.g., BOOLLEAN, BIT, INTE-GER( ), FLOAT( ), etc.), date and time data types (e.g., DATATIME( ), TIMESTAMP*( ), etc.), other data types (e.g., XML formatted data, table, etc.), or any other suitable data types may also be used for storing various types of data for various embodiments described herein to perform their intended functions.

TABLE 1 (FIG. 2I) illustrates an example approach to configure sensitivity criterion/criteria to identify sensitive data. In some embodiments, regular expression patterns may be defined for both the column name and the column data, and sensitivity levels may also be accordingly defined. In the examples illustrated in FIGS. 2C-2H where a row of data is inserted into the "Cust_Info" table 203. FIG. 2E shows an example SQL statement that may be used to insert a row of data into table. In this example, the example SQL statement inserts the data (207) having the value "1000" into the "ID" column and inserts the characters "4685-1458-3658-9848" into the "CARD_NUMBER" column. In response to the insertion of data 207, a redo record 211 having a metadata portion 213F and a change portion 215F may be created in the redo log 213. In this example illustrated in FIG. 2F, the metadata portion 213F may include, for example, "Meta-data:"Insert" op; Trx ID; Block No/offset; Sensitivity Level: Highly Confidential"; and the change portion 215F may include, for example, "ID": 1000, CARD_NUMBER "4567-8901-2345-6789" that may be reapplied to reconstruct a change in a database recovery.

After an insert into the table is done, an after-insert callback function within the database may be invoked to check whether the inserted data includes any sensitive information. For example, the inserted columns may be checked against one or more column name regular expression patterns, and the corresponding inserted data may be checked against one or more column data regular expression patterns. After the pattern checking is done, the "ID" column name and data may be output as Non-Sensitive, whereas "CARD_NUMBER" column name and data may be output as Highly-Sensitive based at least in part on the sensitivity criterion/criteria defined in, for example, TABLE 1. In some embodiments, the sensitivity levels may be stored and subsequently reused for further inserts into the same columns without having to re-apply the regular expressions matches, thereby improving performance.

Figure 2F:
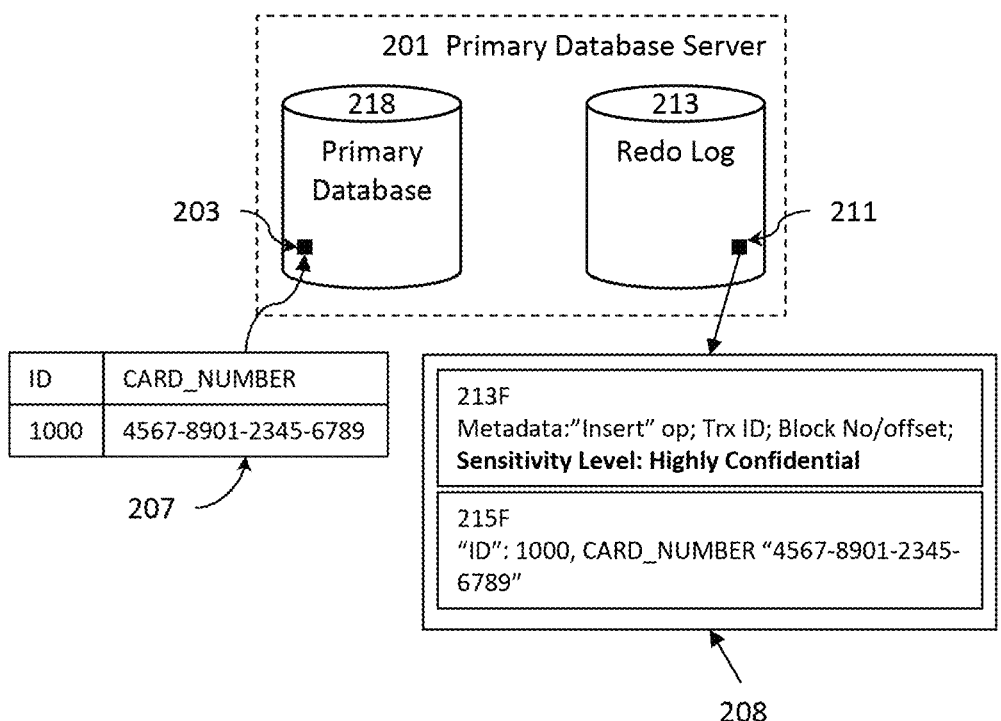

As shown in FIG. 2F where a primary database 201 includes a primary database 218 that receives inserted data 203 with two-column data 207 into the primary database 218. In these embodiments illustrated in FIG. 2F, a redo record 211 corresponding to this insert operation may be placed into the redo log 213. The redo log record 211 may include multiple portions 208 such as a metadata portion 213F and the redo/change portion 215F. Based at least in part on the sensitivity level(s) of the data, the metadata portion 213F may be enhanced to record the sensitivity level (e.g., "Metadata:"Insert" op; Trx ID; Block No/offset; Sensitivity Level: Highly Confidential"). The redo/change portion 215F comprises data for the insert (e.g., "ID": 1000, CARD_NUMBER "4567-8901-2345-6789").

Figure 2G:
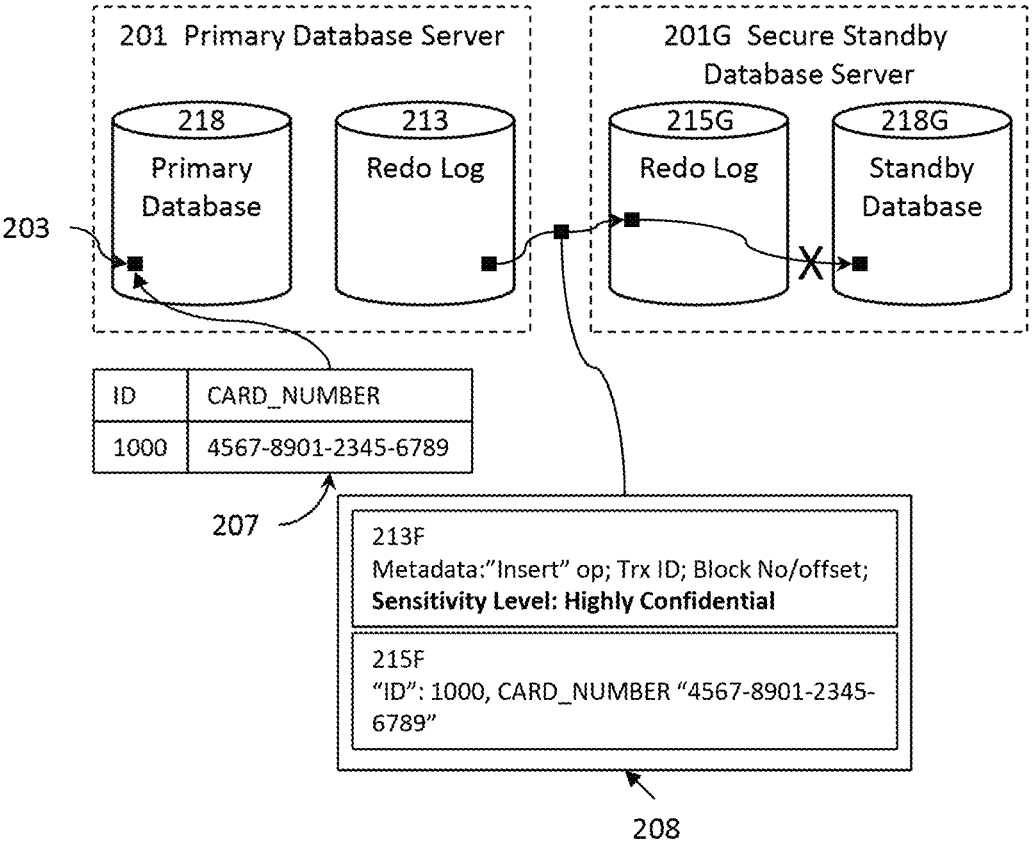

As shown in FIG. 2G where the primary database server 201 includes a primary database 218 that receives an insert 203 having two values in two respective columns 207. A redo record 208 may be created in a redo log file 213 and transmitted to the secure standby database server 201G. In these embodiments illustrated in FIG. 2G, the enhanced redo log record 208 is transmitted to a standby server 201G and stored into the redo log 215G. The standby database server 201G may include a standby database 218G and may be configured for normal replication or secure replication for a change 207 inserted into the primary database 218. In some embodiments where the standby database server 201G is configured for secure replication, a log miner process (not shown) may examine the sensitivity level(s) of the redo record (e.g., a transmitted redo 208 or the metadata portion 213F in a transmitted redo 208); and depending on the sensitivity level, the log miner process may choose to discard the redo record 208 and not transform and/or store the redo record into SQL statement(s).

A log miner performs, for example, analyses of contents of logs such as redo logs and may also be used to provide a view of the database without the need for point-in-time recovery. With a log miner, contents of, for example, a redo log file may be queried based at least in part upon, for example, the dictionary file in use, or one or more parameter settings for the log miner, etc. It shall be noted that a dictionary file may or may not be needed. Without a dictionary file, a log miner may display a table and columns thereof using their internal object identifiers and all values as hex data. A dictionary file may be used to translate this data into a more meaningful format yet for the purpose of determining sensitivity levels or whether a redo log comprises sensitivity information or data, a dictionary is not absolutely required. In some embodiments where a log miner analyzes the contents of a redo log file (or a redo record), the analysis may be confined by using, for example, one or more timecodes, time stamps, or SCNs (system commit numbers).

Figure 2H:
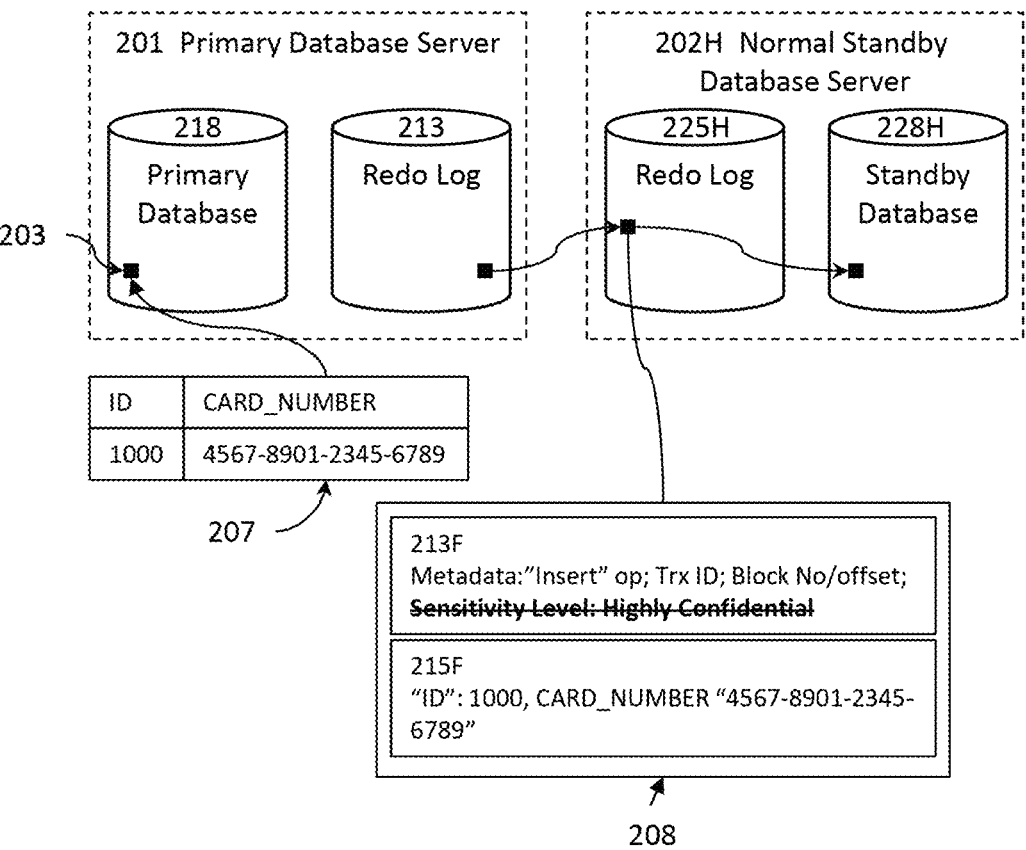

In some embodiments, the standby database server is configured for normal replication as shown in FIG. 2H where the primary database server 201 includes a primary database 218 that receives an insert 203 having two values in two respective columns 207. A redo record may be created in the redo log 213 on the primary database; and the redo record may be individually or in the form of a redo stream transmitted to the normal standby database server 202H having a redo log 225H and a standby database 228H.

In some of these embodiments, the sensitivity level (e.g., sensitivity level in the metadata portion 213F) of the redo log record 208 may be ignored (e.g., ignored by overriding or not accounting for the sensitivity level in the metadata portion 213F), and the redo record 208 or the change portion 215F may be transformed to, for example, one or more SQL statements that may be applied to the standby database 228H to reconstruct the change 207, which was made to the primary database 218, on the normal standby database 228H.

FIG. 3A illustrates a more detailed block diagram for implementing a logical standby database with real-time secure subsetting techniques in one or more embodiments. More specifically, FIG. 3 illustrated an example of a more detailed block diagram of an approach to create a subset logical standby database with sensitive data removed according to some embodiments. At 302A, sensitivity criterion or criteria may be configured (e.g., regular expressions for identifying different levels of sensitive data are defined). For example, credit card numbers may be considered as highly confidential data and to identify them, regular expressions can be defined to check if the column name matches the "CREDIT_CARD.*;CARD_NUMBER.*; CCN.*;CREDIT CARD.*" regular expression and also if the column data matches the "^((4[0-9]{3})|(5[1-5][0-9]{2})|(6011))[-._]?[0-9]{4}[-._]?[0-9]{4}[-._]?[0-9]{4}|3[47]([-._]?[0-9]){13}$" regular expression. Similarly email addresses of customers may be considered as confidential data, and to identify them, regular expressions may be defined to check if the column name matches the "EMAIL.*; MAIL.*" regular expression and also if the column data matches the "^[a-zA-Z0-9._%+-]+@[a-zA-Z0-9.-]+\.[a-zA-Z]{2,4}$" regular expression.

At 304A, when a change occurs at the primary database, before generating a redo record, the inserted data is checked to determine whether the inserted data includes any sensitive data. For example, the column names of the inserted data may be matched against the column name regular expressions, and the actual data may be matched against the column data regular expressions to determine whether any of the column names and/or actual data match the corresponding column names and/or data to identify the sensitivity level.

In some embodiments, optimizations may be done to avoid re-matching regular expressions for every row inserted if the columns within the row are already identified as sensitive. Once the sensitivity level is determined, at 306A and 308A, a redo log record may be generated for a change made to a primary database. A redo log record may include, for example, a metadata portion and a redo/change portion in some embodiments. A metadata portion comprises various items of metadata that may be pertinent to the redo log record, such as the type of operation performed by the change (e.g., an insert operation), the ID of the transaction that performs the operation, the specific block/offset of the data block affected by the operation, the time and/or SCN (system commit number) of the operation, or any combinations thereof.

A metadata portion of a redo log record may be enhanced to include, for example, the sensitivity level of the record. At

310A, the redo log record may be stored into the redo log (e.g., a set of one or more redo log files) at the primary database. At 312A, the redo log record may be transmitted to the standby.

Prior to persistently storing and/or processing the redo log record on the standby database side, a determination may be made at 314A to determine whether the standby database is configured as a secure standby database or a normal standby database. In some embodiments where a standby database is configured as a normal standby, the sensitivity level is overridden and normal process of applying the redo is followed. In some embodiments where the standby database is configured as a secure standby database, a further determination may be made by, for example, a log miner on the standby database at 316A to decide whether to apply or discard the redo based on the sensitivity level.

In some embodiments, whether a redo record is be applied or discarded may be determined based on a determination of whether the redo/change portion of the redo record includes sensitive data or information (316A). If the sensitivity level is, for example, Public, Non-Sensitive, or any other suitable levels, etc. then the redo record may be transformed at 318A into, for example, one or more SQL statements that may be subsequently applied to the standby database by, for example, a log apply engine. On the other hand, if the sensitivity level is Sensitive, Confidential, Highly Confidential, or any other suitable levels, etc. then the redo record may be discarded at 320A, without being transformed or applied, thereby achieving data subsetting with sensitive data discarded. In some of these embodiments, discarding a redo record may include ignoring some or all of the change or redo portion of the redo record or the redo record itself in its entirety.

In some other embodiments, discarding a redo record may include redacting, replacing, or rearranging some or a portion of the redo record (e.g., a portion of the sensitive information, the sensitive information in its entirety, a portion comprising the sensitive information in the redo record, the entire redo record, etc.) with random, non-sensitive information such as nulls or other suitable non-sensitive information, etc. In yet some other embodiments, a redo record that is determined to include sensitive information is removed from memory without being considered or stored on the standby database.

Sensitive data may be discarded in many different ways. For example, sensitive data may be discarded by removing the sensitive data from the change/redo portion in some embodiments. In some other embodiments, sensitive data may be discarded by nullifying the sensitive data with, for example, nulls or other non-sensitive data. In other embodiments, sensitive data may be discarded by redacting at least a portion of the sensitive data. In some embodiments where sensitive data is discarded at 320A, an SQL layer may be modified or reconfigured at 322A to prevent any subsequently received SQL statements that refer to such discarded sensitive data. In some other embodiments where SQL layer is not modified or reconfigured, the requestor of a SQL statement referencing sensitive data that has been discarded may be provided with a notice or message indicating that the SQL statement pertains to sensitive data that is not available or discarded from the database. In some other embodiments, an SQL layer may be enhanced so that when the SQL layer applies an SQL statement referencing sensitive data in a database table, the SQL layer does not return any such data that has been determined to be confidential, highly confidential, or any other similar sensitive levels, etc.

FIG. 3B illustrates a more detailed block diagram for implementing a physical standby database with real-time secure subsetting techniques in one or more embodiments. More specifically, FIG. 3B illustrates an example of a more detailed flow diagram of an approach to create a subset physical standby database with sensitive data removed according to some embodiments of the invention. Because the physical structure of a physical standby database should remain identical to that of the primary database, a redo apply engine on the standby database may examine the sensitivity of the data, and if the redo apply engine determines the data as sensitive, the corresponding data in the rows may be modified (e.g., replaced with null values, redacted, etc.) and applied. An SQL layer may also be enhanced to not return such sensitive data when queries are made against these tables.

In these embodiments illustrated in FIG. 3B, sensitivity criterion or criteria may be configured or identified at 302B. A determination may be made at 304B to decide whether the redo or change portion of a redo record includes sensitive information or data. A redo record may be generated for a change made to a primary database at 306B and 308B. In some embodiments, a redo record may be augmented, enhanced, or merged with the sensitive level of the redo or change portion of a redo log record. For example, a redo record may be augmented, enhanced, or merged with a metadata portion that comprises data or information indicative of the sensitive level of the redo or change portion of the redo record (e.g., public, non-sensitive, or other similar sensitive levels at 306B or sensitive, highly sensitive, or other similar sensitive levels at 308B).

The redo record generated at 306B and/or 308B may be stored in a redo log having a set of one or more redo log files on the primary database at 310B. To implement data consistency, the redo record stored at 310B may be transmitted to a standby database at 312B in the form of an individual redo record or a redo stream. A determination or identification may be made at 314B to decide whether the physical standby database is a physical secure standby database or a normal physical standby database at 314B.

In some embodiments where the determination at 314B is a normal physical standby database, the redo record may be applied at 318A to one or more blocks in the physical standby database that correspond to the change made on the primary database in a block-by-block manner. In some embodiments where the determination at 314B is to implement a secure physical standby database, a further determination may be made at 316B to decide whether the redo or change includes only public, non-sensitive, or other similar sensitivity data (Yes in 316B), where the redo record may be applied at 318A to one or more blocks in the physical standby database that correspond to the change made on the primary database in a block-by-block manner. On the other hand, if the determination at 316B is that the redo or change portion of the redo record includes sensitive data or information (No at 316B), the sensitive information or data may be discarded (e.g., replaced with null values, redacted, removed, or any other suitable manners) at 320B, and the remaining redo record may be applied at 318B to one or more blocks in the physical standby database that correspond to the change made on the primary database in a block-by-block manner.

In some of these embodiments, discarding a redo record or sensitive information in a redo record at 320B may include replacing some or all of the sensitive information (e.g., one or more rows, one or more data blocks etc. corresponding to the sensitive information for a standby database table) with non-sensitive information (e.g., nulls or other suitable non-sensitive information). In some other embodiments, discarding a redo record or sensitive information in a redo record at 320B may include an action to randomize, redact, replace, or rearrange some or all of the sensitive information in such a way that the sensitivity level after the randomization, redaction, replacement, or rearrangement is reduced to non-sensitive, public, non-confidential, or any other suitable levels that comply with various regulations.

Therefore, what has been described is an improved approach to generate subset data with sensitive data removed from within a database infrastructure, where the disaster recovery infrastructure of a database system is used to generate subset data with sensitive data removed. In this way, rather than requiring external tools, a database can generate subset data with sensitive data removed using its internal processing mechanisms.

FIG. 4 illustrates a high-level block diagram for implementing a physical standby database with real-time secure subsetting techniques in one or more embodiments. In these one or more embodiments, one or more sensitivity criteria for data stored in a database table may be determined at 402. The data for which the one or more sensitivity criteria are determined may pertain to a change made to a primary database.

In some embodiments where the sensitivity levels of various pieces of data in the database table have already been determined, determining one or more sensitivity levels at 402 may include identifying the one or more corresponding sensitivity levels from, for example, a column indicating the respective sensitivity levels of corresponding rows in the database table. In some other embodiments, a sensitivity level such as public (or non-sensitive), confidential (or sensitive), highly confidential (or highly sensitive), etc. may be configured by a user or programmatically by, for example, programmatically examining a pattern of the data and/or the data itself.

For example, a sensitivity level may be determined by using or executing against a model (e.g., a machine learning model or any other suitable models) with respect to a column in which the data is located or against the data itself to determine whether the column or data matches a predetermined pattern (e.g., a pattern for social security numbers, a pattern for credit card numbers, etc.) for which a sensitivity level has been determined. In some embodiments, the sensitivity level may be determined by respectively executing a name regular expression and/or a data regular expression that perform exact and/or fuzzy matches on, for example, the column name and/or the column data corresponding to the data to identify a corresponding, existing column name pattern and/or a corresponding, existing data pattern. A mapping may be consulted or looked up to identify the sensitivity level for the corresponding, existing column name pattern and/or the corresponding, existing data pattern; and this identified sensitivity level may be determined as the sensitivity level for the data pertaining to the change. It should be noted that the sensitivity level corresponding to a change may be determined at 402 before, at, or after the change is made to the primary database. The one or more sensitivity criteria so determined may be referenced in determining how the change made or to be made to a primary database may be replicated in a standby database.

A tagged or enhanced redo record may be generated at 404 for a change made on the primary database based at least in part upon the corresponding sensitivity level for the change. In some embodiments, the one or more corresponding sensitivity levels for the change are determined before, at, or after the generation of a redo record for the change based at least in part upon a design choice.

In some embodiments within the context of multiple database instances, each database instance may correspond to a set of one or more redo log files and may also be referred to as a redo thread. In some embodiments, only one database instance accesses a database so only one thread is present in these embodiments. In some other embodiments, two or more instances may concurrently access a single database, and each of these two or more instances may have its own thread of redo. In these embodiments, a separate redo thread for each database instance may avoid contention for a single set of redo log files, thereby eliminating a potential performance bottleneck.

A redo log file is filled with redo records. A redo record, which may also be referred to as a redo entry, comprises a group of one or more change vectors, each of which includes a description of a change made to a single block in the database. For example, if a value in a database table is changed, a redo record having one or more change vectors that describe the change to the data segment block for the database table, the undo segment data block, and/or the transaction table of the undo segments may be created in some embodiments. In some of these embodiments, a redo entry records data that the database may subsequently use to reconstruct the corresponding change(s) made to the database, including the undo segments. In these embodiments, the redo log may also protect rollback data. When a database is to be recovered by using redo data, the database reads the change vectors in the redo records and applies the changes to the relevant blocks.

In some embodiments, a redo log of a database may include only one redo log file. In some other embodiments, a redo log of a database may include two or more redo log files. In these latter embodiments, the database uses a minimum of two redo log files to guarantee that one redo log file is always available for writing while another redo log file is being archived (e.g., if the database is in an ARCHIVELOG mode). In some embodiments, a log writer (LGWR) writes to redo log files in a circular fashion. For example, when the current redo log file fills, a log writer may begin writing to the next available redo log file. When the last available redo log file is filled, the log writer returns to the first redo log file and writes to the first redo log file, repeating the cycle again. In these embodiments, a filled redo log file may be available to a log writer for reuse, depending on, for example, whether archiving is enabled. For example, if archiving is disabled (e.g., the database is in a NOARCHIVELOG mode), a filled redo log file may be available after the changes recorded in the filled redo log file have been written to the datafiles. On the other hand, if archiving is enabled (e.g., the database is in an ARCHIVELOG mode), a filled redo log file may be available to a log writer after the changes recorded in the filled redo log file have been written to the datafiles, and the file has been archived.

In some embodiments, a redo record may be tagged or enhanced with the sensitivity level in many different ways. For example, a redo record may be modified to include a metadata portion that further includes the sensitivity level for the data pertaining to the redo record in some embodiments. In these embodiments, the redo record may thus include a metadata portion having the sensitivity level or information thereof as well as a change or redo portion that comprises the change to be made to one or more particular columns and rows or one or more data blocks. In some other embodiments, a redo record may be tagged or enhanced by associating the sensitivity level or information therefor with the redo record by using, for example, a link such as a pointer, a symbolic link, or any other suitable linking structure.

A replication mode of a standby database may be determined at 406 for the primary database. A replication mode may include, for example, a normal replication model and/or a secure replication mode in some embodiments. Regardless of the replication mode, standby databases for a primary database may include a physical standby database, a logical standby database, and/or a snapshot standby database. In some embodiments, a physical standby database is synchronized with the primary database by using media recovery to apply redo that was generated on the primary database. The use of media recovery may ensure that a physical standby database is a block-for-block identical copy of the primary database in some embodiments. In the event of a failure, the data will remain intact and consistent with data that existed on the primary database with the physical standby database.

In some embodiments, a physical standby database in a normal replication mode may offer fast and efficient failover to a block-for-block copy of the primary database or may perform role reversal of the primary and standby databases (e.g., switchover between the primary and the standby databases) for planned maintenance. Moreover, a physical standby database may offload backups from the primary database and may allow for minimal or reduced downtime upgrades and/or patching with the use of, for example, a transient logical standby database feature. In some embodiments, a physical standby database may further allow for opening the physical standby database in a read-only mode to perform reporting while redo data is being applied.

In some embodiments, a physical standby database in a normal replication mode may include a snapshot standby database that is a physical standby database that has been temporarily opened in read-write mode. In some of these embodiments, flashback database technology may be used to facilitate this functionality. For example, when a physical standby database is converted into a snapshot standby, an implicit guaranteed restore point may be created for the standby database in some embodiments. After a physical standby database has been converted to a snapshot standby database, the snapshot standby database may still receive all of the redo data, but instead of immediately applying the redo, the redo data may be archived into one or more logs (e.g., one or more archive logs) at the standby site.

When the snapshot standby database is converted to a normal physical standby database, all changes made while the database was in read-write mode may be discarded, and the archived redo data may then be applied from the restore point forward, rendering the physical standby database transactionally consistent with the primary database. In some embodiments, switchover and/or failover operations may not be permitted on a snapshot standby database until and unless the database is converted to a physical standby. A snapshot standby database may be used, for example, to troubleshoot application-related issues that are dependent on production data, to ensure proper application functionality and performance prior to application upgrades take place on the production system, etc. In some embodiments, a snapshot standby database may be converted (e.g., temporarily) from a physical standby database. Therefore, all of the techniques described herein for both the normal replication mode and the secure replication mode for a physical standby database may be equally applied to a snapshot standby database.

A standby database may also include a logical standby database that is maintained in sync with the primary database by, for example, transforming redo data received from the primary database into one or more logical SQL (structured query language) statements and then executing those one or more logical SQL statements against the logical standby database. Because these one or more SQL statements are applied instead of performing media recovery, a logical standby may include the same logical information but at the same time may have a different physical structure in some embodiments. A logical standby database may be open for user access while applying changes, render the logical standby database a good solution for, for example, a reporting database while maintaining its disaster recovery attributes. A logical standby database may provide various advantages such as allowing for zero or near zero downtime for database upgrades, offloading reporting from the primary database, creating additional objects to support reporting operations, etc.

The tagged redo record may be transmitted from the primary database to the standby database, and the change may be replicated or reconstructed at 408 on the standby database with data subsetting described herein based at least in part upon the tagged redo record corresponding to the change and the replication mode. For example, the redo or change portion of the redo may be replicated on a physical standby database in a normal replication model in a block-by-block manner. As another example, sensitivity data may be discarded, nullified, redacted, etc. to replicate the redo or change portion of the redo on a standby database in a secure replication model (e.g., a physical, secure standby database, a logical, secure standby database, etc.) by using various data subsetting techniques described herein.

In some embodiments, data subsetting comprises extracting a smaller sized portion (e.g., a referential integer set of data) from a database to form another database. For example, data subsetting may take a consistent part of a database (e.g., a production database) and transfer the consistent part to another database (e.g., a non-production database such as a database for testing). Data subsetting thus reduces the need for data storage, idle times, etc. and provides more comprehensive control in, for example, test, development, etc. turnarounds.

FIG. 5A illustrates a high-level block diagram for implementing a standby database with real-time secure subsetting techniques on a primary database in one or more embodiments. More specifically, FIG. 5A illustrates an example of implementing a standby database with real-time or nearly real-time secure subsetting techniques on the side of a standby database in some embodiments. In these embodiments, a standby database may detect whether a tagged redo record from the primary database includes sensitive information at 502A based at least in part upon, for example, one or more sensitivity criteria pertaining to the tagged redo record determined at 402. The tagged redo record may be received at the standby database individually or in a redo record stream from the corresponding primary database.

The tagged redo record or the data corresponding to the redo or change portion may be transformed at 504A based at least in part upon the replication mode of the standby database and the one or more sensitivity criteria. In some embodiments where the standby database is a physical standby database, the aforementioned tagged redo record or the data may be transformed into a transformed redo record or transformed data by, for example, redacting some or a smaller portion of the sensitive information, nullifying the sensitive information (e.g., replace sensitive information with nulls), replacing some or a smaller portion of sensitive information with random or pseudo-random data or information, etc.

In some embodiments where the standby database is a logical standby database, the aforementioned tagged redo record or data may be transformed (e.g., by a log miner) into one or more SQL statements that may be subsequently applied to the standby database with, for example, a log writer to replicate the change(s) made on the primary database. In some embodiments where a standby database is a logical, secure standby database, the aforementioned tagged redo record or data may be transformed into a transformed redo record or transformed data by, for example, redacting some or a smaller portion of the sensitive information, nullifying the sensitive information (e.g., replace sensitive information with nulls), replacing some or a smaller portion of sensitive information with random or pseudo-random data or information, etc. In some embodiments where the sensitive data is discarded, redacted, or nullified as described herein, the standby database is effectively created as a subset of the primary database with the data subsetting technique described herein.

The transformed redo record or transformed data may be stored in a set of one or more redo log files at 506A for the standby database. When the standby database is in a secure replication mode, at least some of the sensitive information or data in the original data on the primary database is removed (e.g., by discarding, nullification, or replacement described above) in such a way that the sensitivity level of the transformed redo record is no longer determined to be sensitive or confidential or any other higher sensitivity levels so that the storage of data in the standby database complies with various regulations concerning data privacy.

The change made to the primary database may be replicated at 508A on the standby database at least by applying the transformed redo record or transformed data to the standby database. In some embodiments where the standby database is a physical standby database, the change may be replicated at 508A by, for example, performing a block-by-block creation of data block(s) pertaining to the change from the primary database. In some embodiments where the standby database is a logical standby database, the change may be replicated at 508A by applying (e.g., via an SQL layer) the one or more SQL statements to the standby database.

In some embodiments, the SQL layer applying the one or more SQL statements may be modified or enhanced so that an SQL statement referencing sensitivity information or data in its operations will not throw an error due to the unavailability of the sensitive information or data. For example, an SQL layer may notify the requestor of the SQL statement that the sensitive information or data is not available. In some embodiments, the SQL layer may be modified to redirect or to provide information about redirecting the SQL statement referencing the discarded, nullified, or redacted sensitive information or data to another database (e.g., the primary database) on which the sensitive information or data is still available.

FIG. 5B illustrates another high-level block diagram for implementing a standby database with real-time secure subsetting techniques on the standby database in one or more embodiments. More specifically, FIG. 5B illustrates a high-level block diagram for implementing a standby database with real-time or near real-time (e.g., ignoring the time lapse due to data transmission and/or executions of instructions or operations, etc.) on the side of the primary database in some embodiments. In these embodiments, the primary database may detect whether a change to the primary database pertains to sensitive information at 502B based at least in part upon the one or more sensitivity criteria determined at, for example, 402.

A tagged redo record may be generated at 504B for the change based at least in part upon the one or more sensitivity criteria pertaining to the change by, for example, a log writer (LGWR). As described above with reference to FIG. 5A, a redo record may be tagged or enhanced with the sensitivity level in many different ways. For example, a redo record may be modified to include a metadata portion that further includes the sensitivity level for the data pertaining to the redo record in some embodiments. In these embodiments, the redo record may thus include a metadata portion having the sensitivity level or information thereof as well as a change or redo portion that comprises the change to be made to one or more particular columns and rows or one or more data blocks. In some other embodiments, a redo record may be tagged or enhanced by associating the sensitivity level or information therefor with the redo record by using, for example, a link such as a pointer, a symbolic link, or any other suitable linking structure.

The primary database may store the tagged redo record for the change in a set of one or more log files at 506B. In some embodiments, each database instance (e.g., a primary database instance, a standby database instance, etc.) may corresponds to a separate set of one or more redo log files managed by a separate redo thread to avoid contention for a single set of one or more redo log files.

The tagged redo record or the data corresponding to the redo or change portion may be optionally transformed on the primary database at 508B based at least in part upon, for example, the replication mode of a standby database for the primary database and the one or more sensitivity criteria. Compared to the embodiments illustrated in FIG. 5A, the primary database creates a tagged redo record on behalf of the standby database so that no sensitive or confidential information or data is transmitted from the primary database (on which sensitive or confidential data or information is stored) to the standby database in some embodiments where the standby database is in a secure replication mode. In some embodiments where the standby database is a physical standby database, the aforementioned tagged redo record or the data may be transformed into a transformed redo record or transformed data by, for example, redacting some or a smaller portion of the sensitive information, nullifying the sensitive information (e.g., replace sensitive information with nulls), replacing some or a smaller portion of sensitive information with random or pseudo-random data or information, etc.

In some embodiments where the standby database is a logical standby database, the aforementioned tagged redo record or data may be transformed (e.g., by a log miner for the primary database) into one or more SQL statements that may be subsequently applied to the standby database with, for example, a log writer to replicate the change(s) made on the primary database. In some embodiments where a standby database is a logical, secure standby database, the aforementioned tagged redo record or data may be transformed by the primary database into a transformed redo record or transformed data by, for example, redacting some or a smaller portion of the sensitive information, nullifying the sensitive information (e.g., replace sensitive information with nulls), replacing some or a smaller portion of sensitive information with random or pseudo-random data or information, etc. In some embodiments where the sensitive data is discarded, redacted, or nullified as described herein, the standby database is effectively created as a subset of the primary database with the datasubsetting technique described herein. The primary database may then transmit the aforementioned tagged redo record or transformed data to the standby database when it is determined that the standby database is in a secure replication mode.

FIG. 6 illustrates more details for implementing a standby database with real-time secure subsetting techniques in one or more embodiments. More specifically, FIG. 6A illustrates more details about generating a tagged redo record for at change (e.g., with respect to 404 of FIG. 4). In these one or more embodiments, a replication mode of a standby database may be identified at 602 for a primary database. For example, a standby database may be in a normal replication mode where sensitivity levels of data are ignored or in a secure replication mode where sensitive data needs to the further processed.

A determination may be made at 604 to decide whether the standby database is in a secure replication mode or a normal replication mode. In some embodiments where the standby database is in the normal replication mode, a further determination may be made at 606 to decide whether the standby database is a physical standby database or a logical standby database. In some of these embodiments where the standby database is a physical standby database (in the normal replication mode), one or more data blocks pertaining to the redo record may be applied at 610 to the standby database. In some of these embodiments where some data may be associated or tagged with sensitive (or confidential), highly sensitive (or highly confidential), or other higher sensitivity levels, the sensitivity levels may be ignored or overridden (e.g., FIG. 2H). In some other embodiments where the standby database is a logical standby database (also in the normal replication mode), the redo record may be transformed at 612 into a transformed redo. For example, an SQL writer may be invoked to transform the redo record or data pertaining to the change in the redo record into one or more SQL statements at 612. A log apply engine may then apply the transformed redo record to the standby database at 614. As described above with reference to FIG. 5A, the SQL layer applying the one or more SQL statements may be modified or enhanced in some embodiments so that an SQL statement referencing sensitivity information or data in its operations will not throw an error due to the unavailability of the sensitive information or data.

In some embodiments where it is determined that the standby database is in a secure replication mode at 604, a further determination may be made at 608 to decide whether the standby database is a physical standby database or a logical standby database. In some of these embodiments where the standby database is identified as a physical standby database at 608, some or all of the sensitive information or data pertaining to the change may be discarded, nullified, replaced, randomized, rearranged, or redacted at 616 so that the sensitivity level of the is in an identical or substantially similar manner as that described above with reference to FIGS. 3A and 5A.

With the sensitive data or information discarded, nullified, redacted, or replaced at 616 as described above, a copy of one or more data blocks pertaining to the remaining non-sensitive data may be created from the primary database on the physical standby database in the secure replication mode at 618.

In some other embodiments where the standby database is identified as a physical standby database at 608, sensitive information or data in a redo record may be identified at 620; and the redo record or a portion thereof (e.g., the redo or change portion in the redo record) may be transformed into a transformed redo record or transformed data at 622. In some of these embodiments, a redo record or a portion thereof having sensitive information or data may be transformed at 622 into one or more SQL statements that may be executed on the standby database to apply the change to the standby database. Prior to generating the SQL statements at 622, this transformation may first discard, nullify, replace, randomize, rearrange, or redact (collectively "discard") some or part of the sensitive data so that the transformed redo and hence the one or more SQL statements include only data pertaining to the change that is no longer categorized or classified as confidential, sensitive, or any other higher sensitivity levels that are regulated by various regulations (e.g., privacy regulations).

As described above with reference to FIG. 5A, the SQL layer applying the one or more SQL statements may be optionally modified or enhanced at 624 in some embodiments so that an SQL statement referencing sensitivity information or data in its operations will not result in an error due to the unavailability of the sensitive information or data. In some other embodiments, the SQL layer remains unchanged, and the execution of the one or more SQL statements on the standby database results in an error. The transformed redo record (e.g., the aforementioned one or more SQL statements) may be applied (e.g., by a log apply engine for the standby database) to reconstruct or replicate the change, which was made on the primary database, on the standby database.

System Architecture Overview

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

FIG. 8 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 7. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

We claim:

1. A computer implemented method, comprising:

determining one or more sensitivity criteria for a change in a primary database;

tagging a redo record to generate a tagged redo record for the change at least by adding or updating metadata in the tagged redo record to indicate presence or absence of sensitive information in the redo record, based at least in part upon the one or more sensitivity criteria; and reconstructing the change on a standby database at least by checking the metadata in the tagged redo record, based at least in part upon a replication mode of the standby database and whether the standby database is logical or physical, wherein when the standby database is logical, and the metadata indicates the presence of the sensitive information, discarding the tagged redo record, and when the standby database is physical, and the metadata indicates the absence of the sensitive information, modifying the tagged redo record into a modified redo record where the modified redo record is stored in a set of one or more standby redo log files for the standby database, and data subsetting is performed for reconstructing the change on the standby database at least by applying the modified redo record to the standby database, wherein the sensitive information is discarded, nullified, redacted, or replaced, and the data subsetting is performed for reconstructing the change on the standby database at least by updating one or more standby data blocks for the standby database with a copy of one or more primary data blocks for the primary database based at least in part upon the modified redo record.

2. The computer implemented method of claim 1, further comprising determining the replication mode for the standby database, wherein the replication mode comprises at least one of a normal replication mode or a secure replication mode, and the one or more sensitivity criteria are overridden in the normal replication mode.

3. The computer implemented method of claim 1, further comprising:

detecting whether the tagged redo record includes the sensitive information based at least in part upon the one or more sensitivity criteria; and transforming the tagged redo record or data pertaining to the one or more sensitivity criteria in the tagged redo record into the modified redo record based at least in part upon a replication mode of the standby database and the one or more sensitivity criteria.

4. The computer implemented method of claim 1, reconstructing the change comprising transforming the tagged redo record into one or more structured query language (SQL) statements that are applied to the standby database, wherein the standby database comprises a logical standby database, and one or more structured query language (SQL) statements are formed from the tagged redo record such that the sensitive information is discarded, nullified, redacted, or replaced.

5. The computer implemented method of claim 4, further comprising performing the data subsetting for reconstructing the change on the standby database at least by executing the one or more SQL statements on the standby database, wherein the metadata for the change comprises a metadata portion and a redo portion, the metadata portion includes first information indicating the presence of the sensitive information, and the redo portion comprises change data pertaining to the change.

6. The computer implemented method of claim 1, wherein the standby database is physical and remains identical to the primary database and further comprises a structured query language layer that ignores the sensitive information in the tagged redo record for one or more subsequent queries on the sensitive information.

7. A computer program product comprising a non-transitory computer accessible medium storing thereupon a sequence of instructions which, when executed by a processor, causes the processor to perform a set of acts, the set of acts comprising:

determining one or more sensitivity criteria for a change in a primary database;

tagging a redo record to generate a tagged redo record for the change at least by adding or updating metadata in the tagged redo record to indicate presence or absence of sensitive information in the redo record, based at least in part upon the one or more sensitivity criteria; and reconstructing the change on a standby database at least by checking the metadata in the tagged redo record, based at least in part upon a replication mode of the standby database and whether the standby database is logical or physical, wherein when the standby database is logical, and the metadata indicates the presence of the sensitive information, discarding the tagged redo record, and when the standby database is physical, and the metadata indicates the absence of the sensitive information, modifying the tagged redo record into a modified redo record where the modified redo record is stored in a set of one or more standby redo log files for the standby database, and data subsetting is performed for reconstructing the change on the standby database at least by applying the modified redo record to the standby database, wherein the sensitive information is discarded, nullified, redacted, or replaced, and the data subsetting is performed for reconstructing the change on the standby database at least by updating one or more standby data blocks for the standby database with a copy of one or more primary data blocks for the primary database based at least in part upon the modified redo record.

8. The computer program product of claim 7, the set of acts further comprising determining the replication mode for the standby database, wherein the replication mode comprises at least one of a normal replication mode or a secure replication mode, and the one or more sensitivity criteria are overridden in the normal replication mode.

9. The computer program product of claim 7, the set of acts further comprising:

detecting whether the tagged redo record includes the sensitive information based at least in part upon the one or more sensitivity criteria; and transforming the tagged redo record or data pertaining to the one or more sensitivity criteria in the tagged redo record into the modified redo record based at least in part upon a replication mode of the standby database and the one or more sensitivity criteria.

10. The computer program product of claim 7, the set of acts comprising reconstructing the change further comprising transforming the tagged redo record into one or more structured query language (SQL) statements that are applied to the standby database, wherein the standby database comprises a logical standby database, and one or more structured query language (SQL) statements are formed from the tagged redo record such that the sensitive information is discarded, nullified, redacted, or replaced.

11. The computer program product of claim 10, the set of acts further comprising performing the data subsetting for reconstructing the change on the standby database at least by executing the one or more SQL statements on the standby database, wherein the metadata for the change comprises a metadata portion and a redo portion, the metadata portion includes first information indicating the presence of the sensitive information, and the redo portion comprises change data pertaining to the change.

12. The computer program product of claim 7, wherein standby database is physical and remains identical to the primary database and further comprises a structured query language layer that ignores sensitive information in the tagged redo record for one or more subsequent queries on the sensitive information the change comprises a metadata portion and a redo portion, the metadata portion includes first information pertaining to the one or more sensitivity criteria, and the redo portion comprises change data pertaining to the change.

13. A system for implementing a standby database, comprising:
    a processor;
    a memory having stored thereupon a sequence of instructions of program code, which when executed by the processor, causes the processor to execute a set of acts, the set of acts comprising:
    determining one or more sensitivity criteria for a change in a primary database;
        tagging a redo record to generate a tagged redo record for the change at least by adding or updating metadata in the tagged redo record to indicate presence or absence of sensitive information in the redo record, based at least in part upon the one or more sensitivity criteria; and
        reconstructing the change on a standby database at least by checking the metadata in the tagged redo record, based at least in part upon a replication mode of the standby database and whether the standby database is logical or physical, wherein
            when the standby database is logical, and the metadata indicates the presence of the sensitive information, discarding the tagged redo record, and
            when the standby database is physical, and the metadata indicates the absence of the sensitive information, modifying the tagged redo record into a modified redo record where the modified redo record is stored in a set of one or more standby redo log files for the standby database, and data subsetting is performed for reconstruct ing the change on the standby database at least by applying the modified redo record to the standby database, wherein the sensitive information is discarded, nullified, redacted, or replaced, and the data subsetting is performed for reconstructing the change on the standby database at least by updating one or more standby data blocks for the standby database with a copy of one or more primary data blocks for the primary database based at least in part upon the modified redo record.

14. The system of claim 13, the set of acts further comprising determining the replication mode for the standby database, wherein the replication mode comprises at least one of a normal replication mode or a secure replication mode, and the one or more sensitivity criteria are overridden in the normal replication mode.

15. The system of claim 13, the set of acts further comprising:
    detecting whether the tagged redo record includes the sensitive information based at least in part upon the one or more sensitivity criteria; and
    transforming the tagged redo record or data pertaining to the one or more sensitivity criteria in the tagged redo record into the modified redo record based at least in part upon a replication mode of the standby database and the one or more sensitivity criteria.

16. The system of claim 13, the set of acts comprising reconstructing the change further comprising transforming the tagged redo record into one or more structured query language (SQL) statements that are applied to the standby database, wherein the standby database comprises a logical standby database, and one or more structured query language (SQL) statements are formed from the tagged redo record such that the sensitive information is discarded, nullified, redacted, or replaced.

17. The system of claim 16, the set of acts further comprising performing the data subsetting for reconstructing the change on the standby database at least by executing the one or more SQL statements on the standby database, wherein the metadata for the change comprises a metadata portion and a redo portion, the metadata portion includes first information indicating the presence of the sensitive information, and the redo portion comprises change data pertaining to the change.

18. The system of claim 13, wherein the standby database is physical and remains identical to the primary database and further comprises a structured query language layer that ignores the sensitive information in the tagged redo record for one or more subsequent queries on the sensitive information the tagged redo record for one or more subsequent queries on the sensitive information.

* * * * *